Nov. 19, 1963 B. A. PROCTOR 3,111,282

MAGNETIC SOUND REPRODUCTION

Filed Jan. 10, 1961 7 Sheets-Sheet 1

INVENTOR.
BARTON A. PROCTOR
BY
Moses, Nolte, & Nolte
ATTORNEYS

Nov. 19, 1963 B. A. PROCTOR 3,111,282

MAGNETIC SOUND REPRODUCTION

Filed Jan. 10, 1961 7 Sheets-Sheet 2

INVENTOR.
BARTON A. PROCTOR
BY
Moses, Nolte, & Nolte
ATTORNEYS

Nov. 19, 1963 B. A. PROCTOR 3,111,282

MAGNETIC SOUND REPRODUCTION

Filed Jan. 10, 1961 7 Sheets-Sheet 3

INVENTOR.
BARTON A. PROCTOR
BY
Moses, Nolte, & Nolte
ATTORNEYS

Nov. 19, 1963 B. A. PROCTOR 3,111,282

MAGNETIC SOUND REPRODUCTION

Filed Jan. 10, 1961 7 Sheets-Sheet 4

INVENTOR.
BARTON A. PROCTOR
BY
Moses, Nolte, & Nolte
ATTORNEYS

INVENTOR.
BARTON A. PROCTOR
BY
Moses, Nolte, & Nolte
ATTORNEYS

INVENTOR.
BARTON A. PROCTOR
BY
Moses, Nolte, & Nolte
ATTORNEYS

MAGNETIC SOUND REPRODUCTION

Filed Jan. 10, 1961 7 Sheets-Sheet 7

INVENTOR.
BARTON A. PROCTOR
BY
Moses, Nolte, & Nolte
ATTORNEYS

United States Patent Office 3,111,282
Patented Nov. 19, 1963

3,111,282
MAGNETIC SOUND REPRODUCTION

Barton A. Proctor, Larchmont, N.Y., assignor, by direct and mesne assignments, to Proctor Dictating Machine Corporation, New York, N.Y., a corporation of New York Filed Jan. 19, 1961, Ser. No. 81,742
6 Claims. (Cl. 242—55.13)

The present invention relates to magnetic sound reproduction and particularly to the packaging and playing magnetic tape recordings. This application is a continuation-in-part of U.S. patent application Serial No. 577,494, filed on April 11, 1956, now abandoned.

Present magnetic tape recording and reproducing machines require a complex operating procedure. In order to play a record, the reel containing the record must be mounted on the machine. Then the tape is threaded over its prescribed path in juxtaposition to the magnetic pick-up head or heads and over a set of pulleys or equivalent devices. The end of the tape is then fastened to a take-up reel. The threading of the tape and the attachment thereof to the take-up reel requires a considerable amount of time. These operations may entail appreciable difficulty to an inexperienced operator. The excessive amount of handling required increases the likelihood of tearing or other impairment of the tape. The time and effort required to operate magnetic tape recording and reproducing machines has limited their utility.

An object of the present invention is to provide a magnetic tape reproducing apparatus which shall be inexpensive and simple in its operation so that a magnetic tape record can be placed in operating condition as simply as is a phonograph record.

A second object of the invention is to provide safe handling of magnetic tape records by housing each record permanently in a substantially closed casing from which it need not be removed even while being played.

Still another object of the invention is to provide a magnetic tape reproducing apparatus having a minimum number of elements, which elements are substantially fault-free and have an indefinite lifetime.

According to the invention a main casing is provided having an electric motor drive for spinning one or both turntables, and one or more magnetic pick-up heads, as well as the necessary controls for producing the several required operations. The motor drives a pair of shafts which terminate in clutch elements positioned in register with openings in one wall of the main casing. The magnetic heads are located in openings in another wall of the casing. A record container is adapted to be mounted on the main casing and locked thereto in operative position. The record container includes a pair of reels permanently mounted therein. The reels have shafts terminating in a clutch element adapted to cooperate with the clutch elements in the main casing. The magnetic tape record is permanently mounted on the reels and is threaded so that a portion thereof will be held against the magnetic pick-up heads when the record assembly is locked in position. Thus, it is merely necessary to mount the record container on the main casing in order to play a record. If it is desired to substitute another record, it is only necessary to remove one record container and place another one on the main casing.

The invention will be fully understood and many other objects and advantages thereof will become apparent from the following description and the drawing, in which:

FIG. 8 is a perspective view of the reproducing machine with a portion of the casing broken away to show the drive mechanism;

Figure 1:
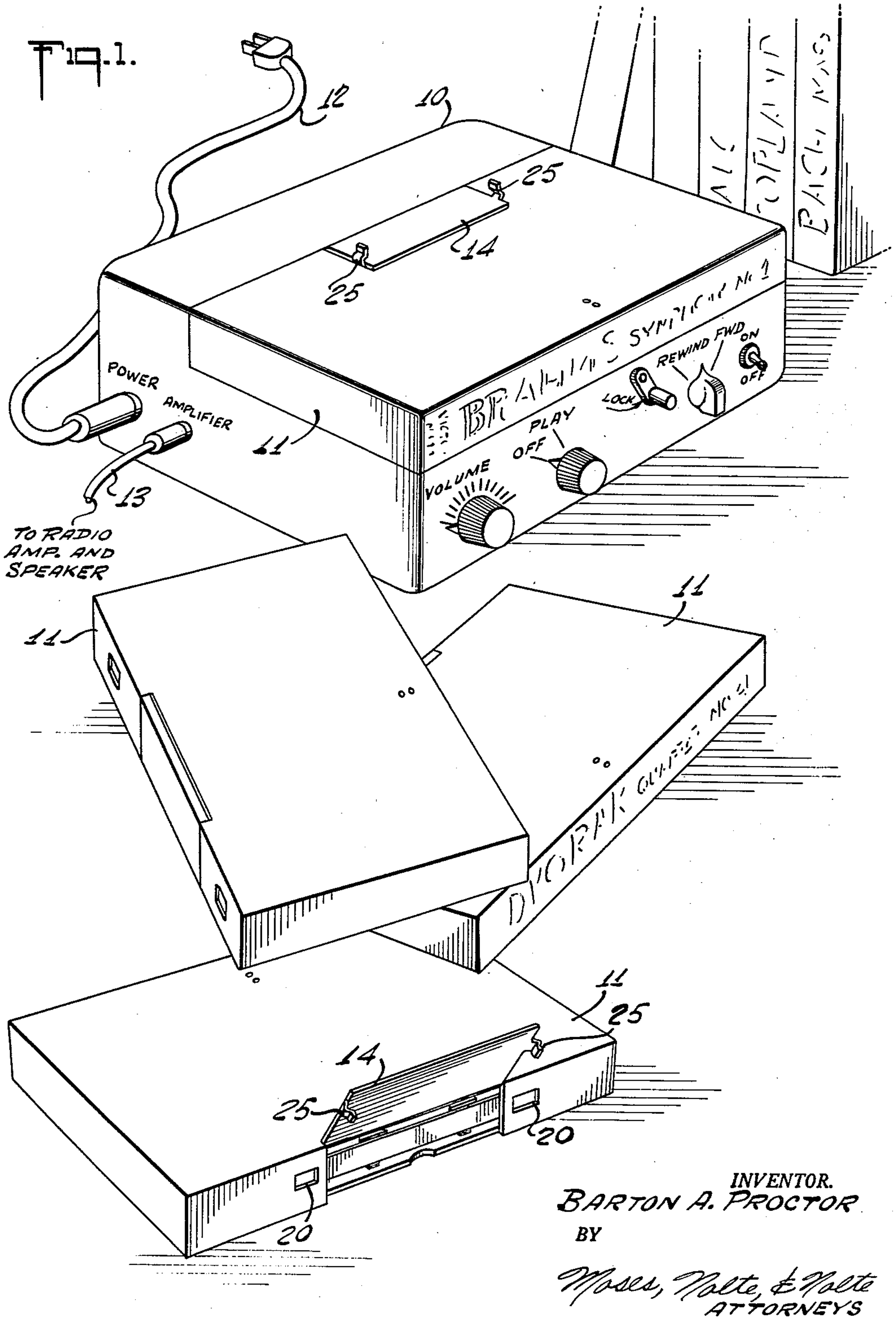
FIG. 1 is a perspective view of one embodiment of the invention.
Figure 2:
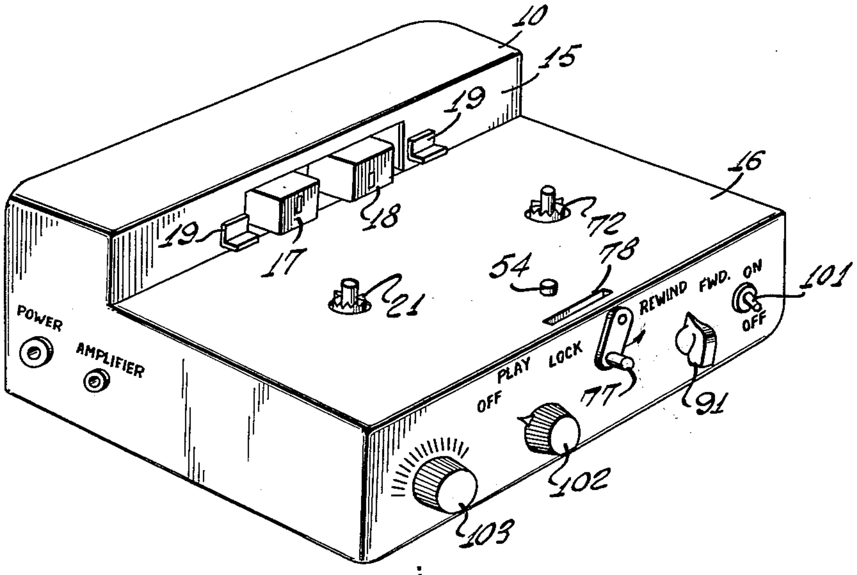
FIG. 2 is a perspective view of the reproducer with the record assembly removed.
Figures 3, 4, 5:
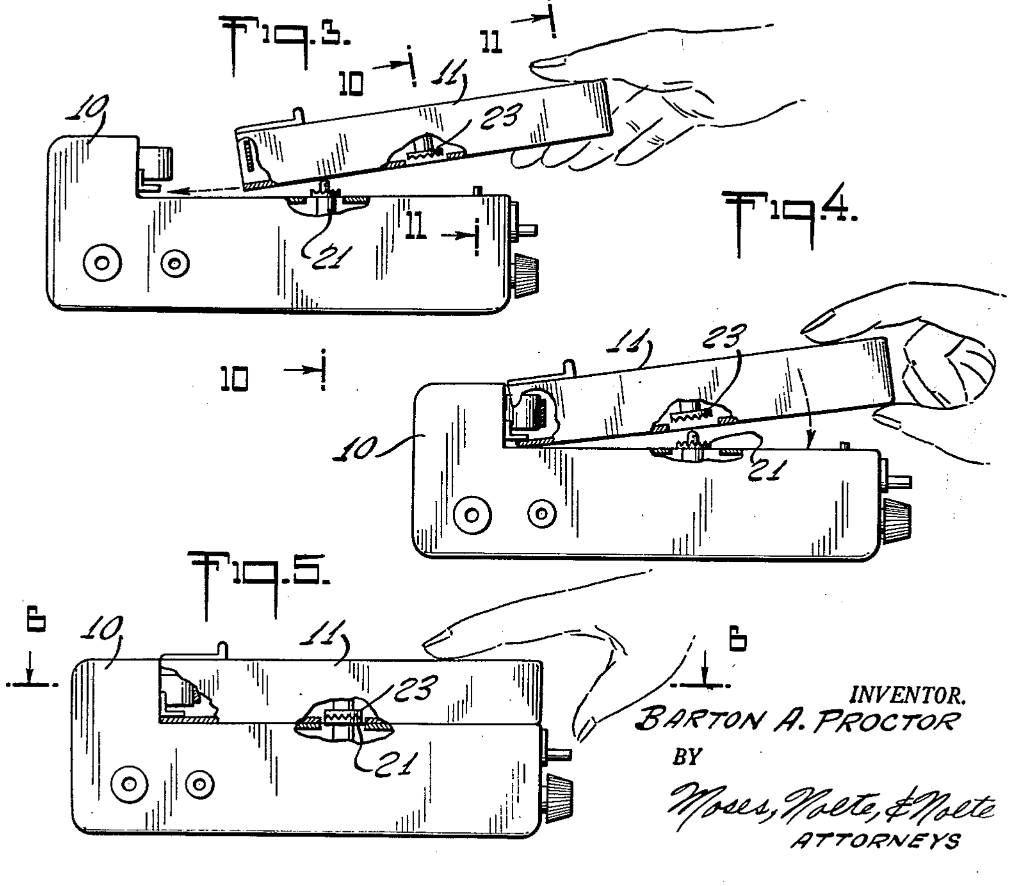
FIGS. 3–5 are views showing the manner in which the record assembly is mounted.
Figure 6:
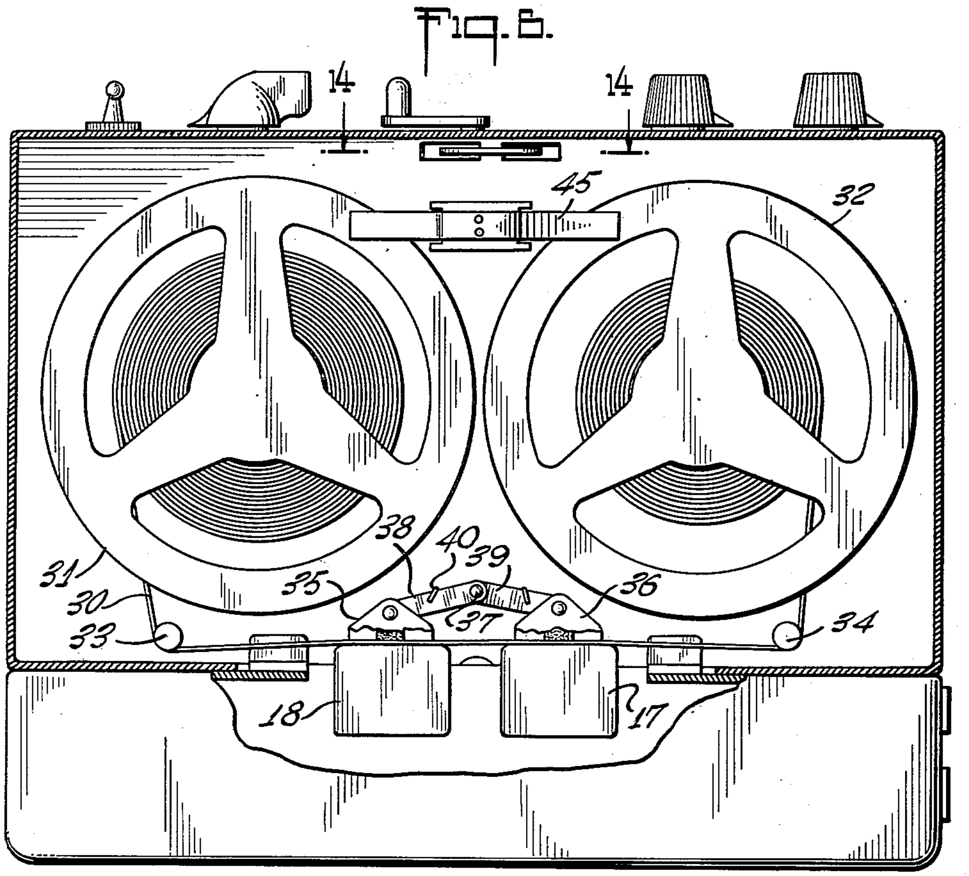
FIG. 6 is a top view of the reproducing machine with a portion of the top broken away.
Figure 7:
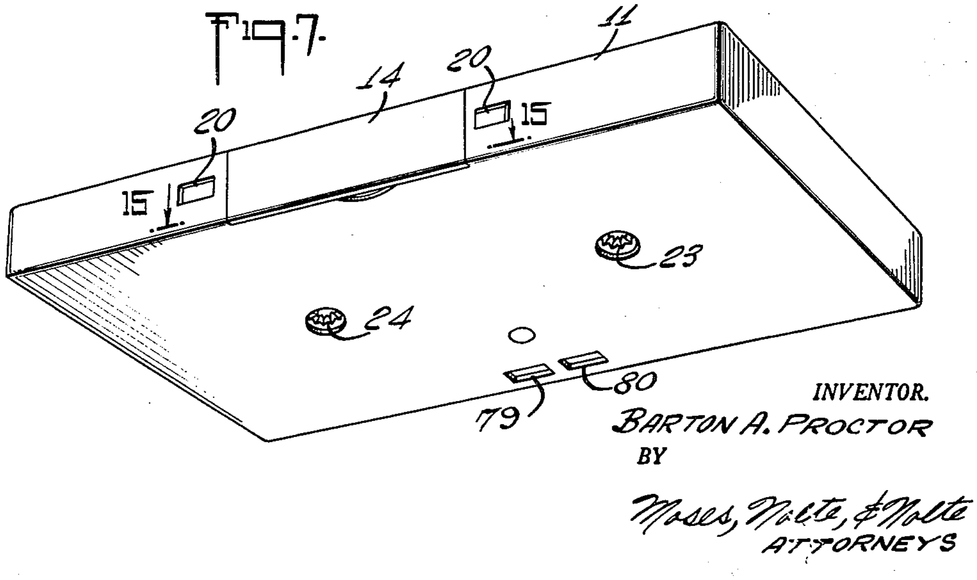
FIG. 7 is a perspective view of the record assembly showing the bottom thereof.
Figure 4:
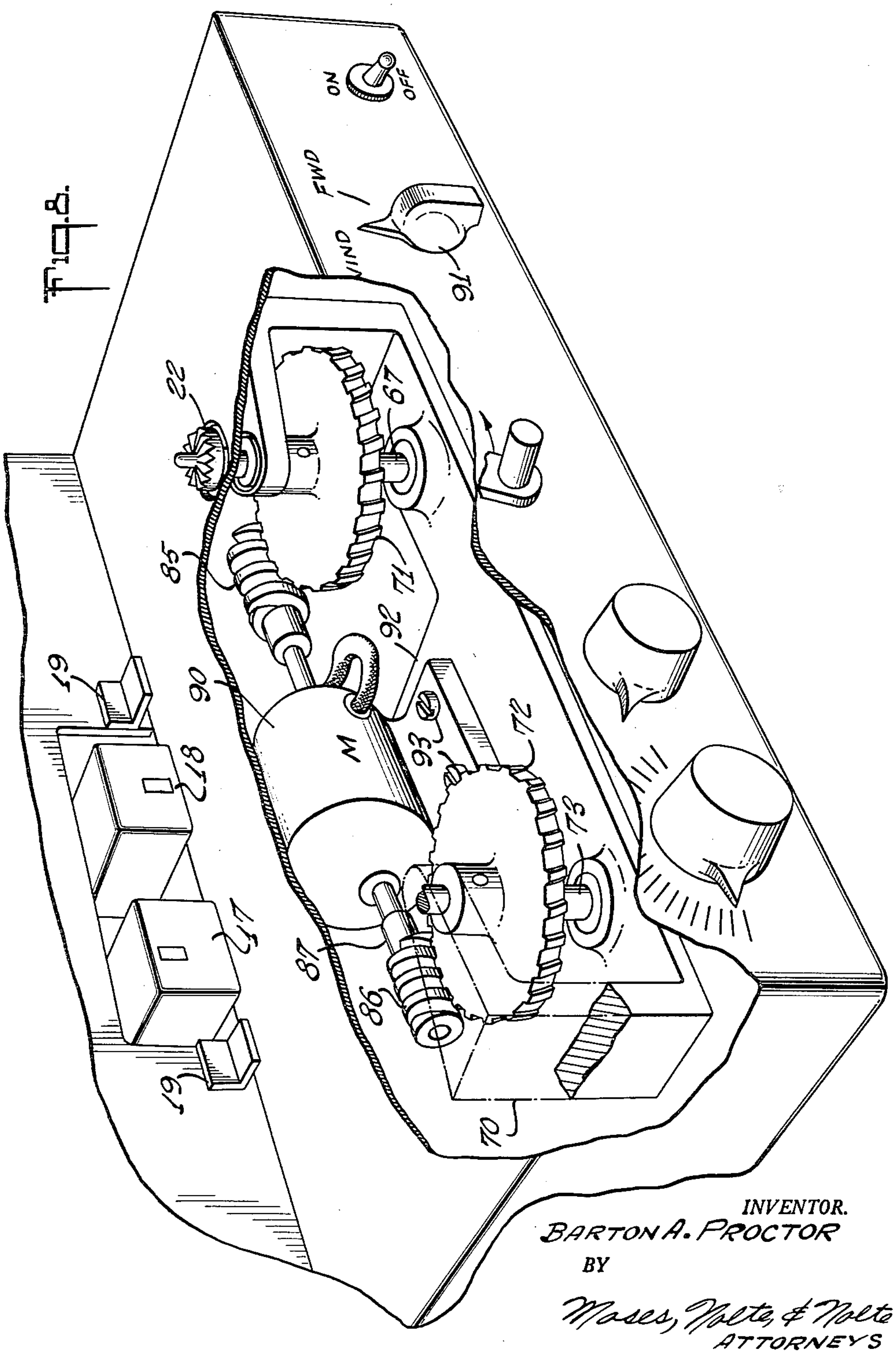
Figure 9:
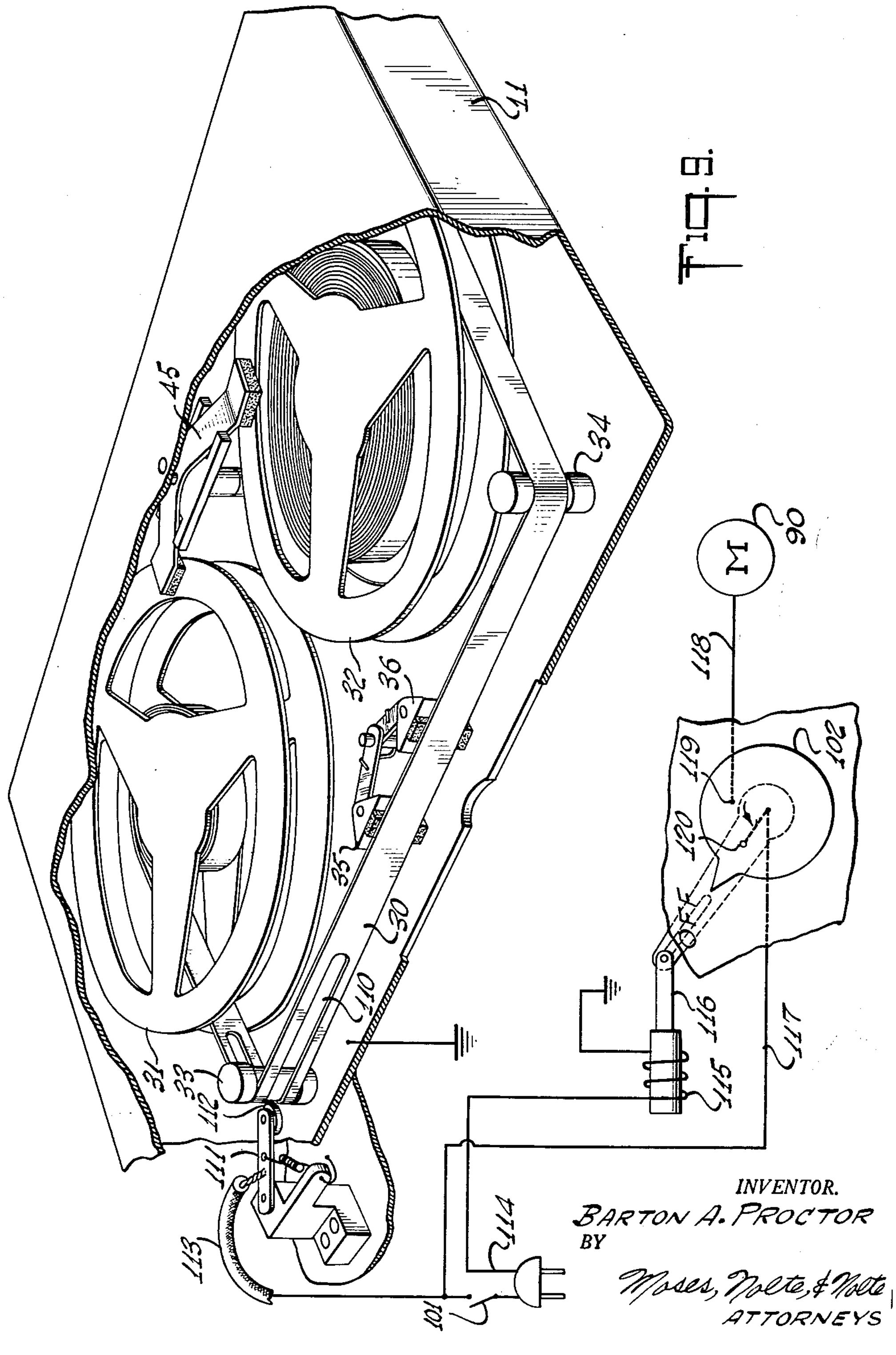
FIG. 9 is a partial perspective view of the record assembly and apparatus for controlling the motor.

Referring to the drawing, there is shown a main casing 10 on which is mounted a record assembly 11. Casing 10 is supplied with power by power cord 12 and is adapted to be connected to a suitable amplifier and loud-speaker by a cable 13. The amplifier and loud-speaker for the recording apparatus may be those of a radio receiver or phonograph. All manual controls for the record player may be mounted on the front panel. Each record container may be plainly marked to indicate the contents thereof. Record casing 11 is provided with a pivoted door 14 having lateral clips 25 for enabling it to be snapped shut. Door 14 is opened when it is necessary to expose the tape to the pick-up head during operation. Casing 10 has a recess bounded by walls 15 and 16 and the recess is of sufficient size to accommodate the record casing 11. Vertical wall 15 is provided with a cut-out portion through which one or more magnetic heads 17, 18 extend. There are also mounted on wall 15 a pair of brackets 19, the lower portions of which are slightly above horizontal wall 16. Brackets 19 cooperate with slots 20 in record casing 11 for positioning the latter on casing 10. The manner in which record casing 11 is mounted on main casing 10 is illustrated in FIGS. 3 to 5. When the mounting is effected, a pair of clutch elements 21 and 22 extending from the main casing, engage similar clutch elements 23 and 24 in the record case.

Within the record case, the magnetic tape 30 is wound on a pair of reels 31 and 32 over pulleys or posts 33 and 34 so that tape 30 contacts magnetic pick-up heads 17 and 18. The tape is held slidably against magnetic heads 17 and 18 by a pair of felt covered shoes 35 and 36. The shoes are pivotally connected to a post 37 by links 38 and 39 which are provided with a spring 40 for urging the shoes toward magnetic heads 17 and 18.

When the record case is not in its operative position, on main case 11, the reels are prevented from rotating and thereby unravelling the magnetic tape. If this were not done, the magnetic tape might unravel to such an extent that when the record case is placed in operative condition and the reels begin to rotate, they might acquire sufficient velocity to break the tape or to tangle or twist it. The reels are secured against rotation by means of a flat spring 45 which is connected centrally to the upper wall 46 of casing 11 by rivets 47. The ends of spring 45 bearing against the tops of the reels are provided with suitable cushioning pads 48 and 49 which may be formed of felt, for example. Spring 45 is adapted to be engated by a slotted plate 50 which is integral with a shaft 51 extending into a sleeve 52 mounted on bottom wall 53 of record case 11. A pin 54 on wall 16 of main casing 10 is adapted to engage shaft 51 thereby raising plate 50 sufficiently to remove spring 45 from the reels and permit them to rotate. Thus the reels are always held securely against rotation except when the record case is mounted in playing position, and only then the reels are automatically released to permit proper operation.

Figure 10:
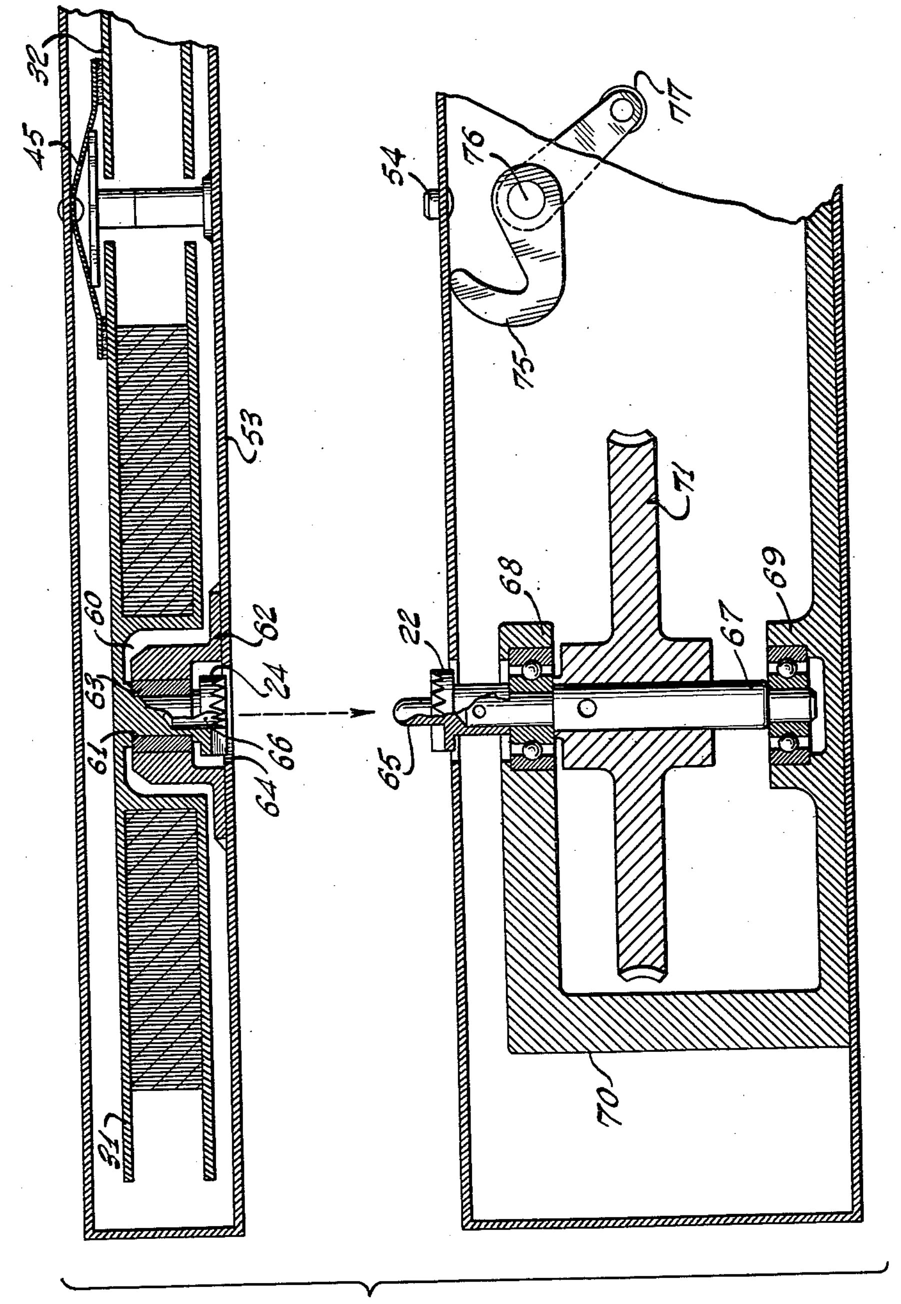
FIG. 10 is a sectional view taken along the line 10—10 of FIG. 3.
Figures 11, 12:
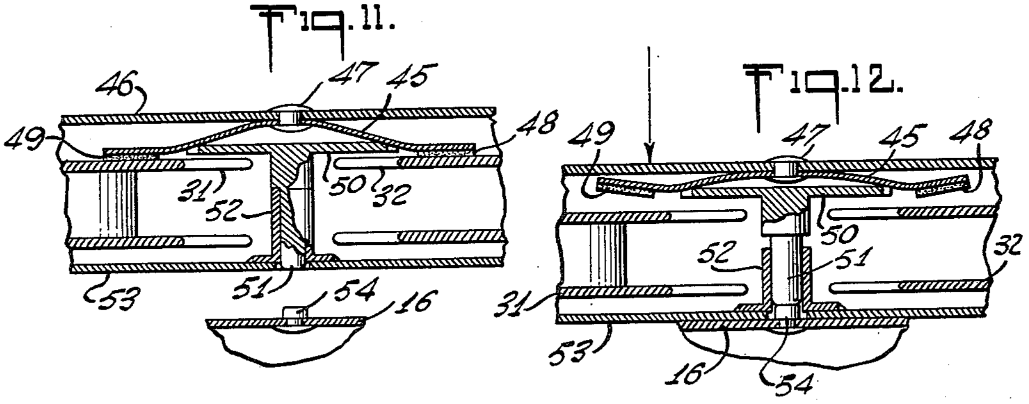
FIGS. 11–13 show a releasible holder for the reel.
Figure 13:
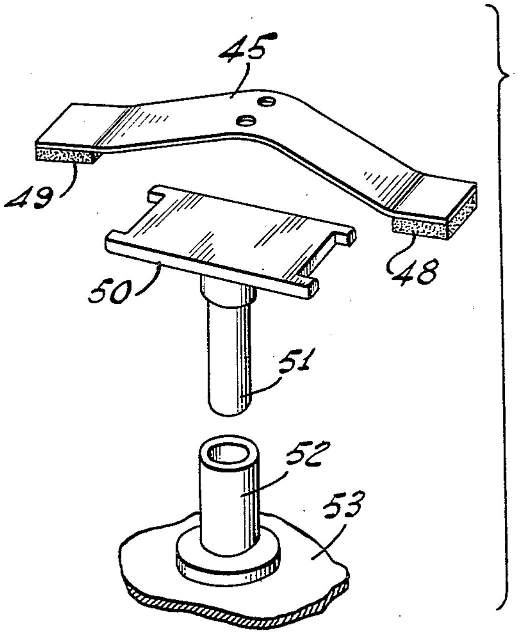

The manner in which the reels are rotatably mounted in case 11 can best be seen in FIG. 10. The two reels may be identical. Reel 31 has a central recess 60 and hub 61 extending into recess 60. A sleeve 62 is fixed to the lower wall 53 of casing 11 by welding or other suitable means and is provided with a bearing 63 in which hub 61 is adapted to rotate. Clutch member 24 is fixed to the lower end of hub 61, through which the cooperating clutch member 22 is adapted to extend and engage clutch member 24. Clutch member 22 is provided with a center pin 65 which projects into hole 66 in clutch member 24. Clutch member 22 is fixed to a shaft 67 having ball bearing mounts 68 and 69 in a yoke 70. A worm wheel 71 is fixed to shafts 67 for coupling it to the drive motor.

Figure 14:
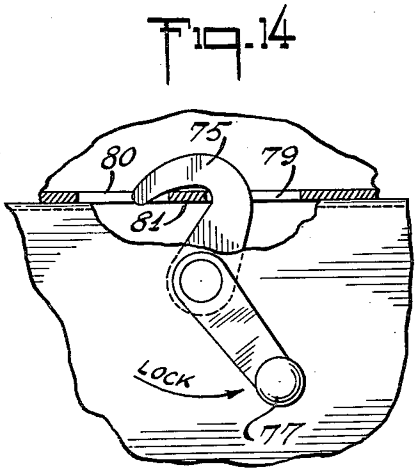
FIG. 14 is a partial view showing means for locking the record assembly to the main casing.
Figure 15:
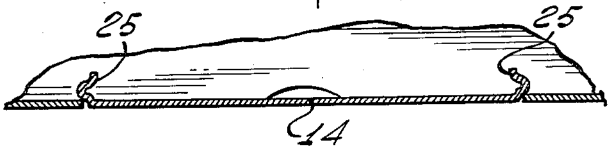
FIG. 15 is a view taken along the line 15—15 of FIG. 7.

Record case 11, after being properly mounted on main casing 10 is locked thereto by a latch 75 which is in the form of a crank and is pivoted on shaft 76. A handle 77 extending from front panel of casing 10 is adapted to turn latch 75 into its locking position as shown in FIG. 14. As handle 77 is turned, the hook of latch 75 rotates through opening 78 in wall 16 and openings 79 and 80 in wall 53 of record case 11. Latch 75 thus engages an intermediate portion 81 of wall 16 and thereby securely holds casing 11 locked to casing 10 in their proper relative positions. It can be seen that when the record case is mounted and locked on the main casing, clutch members 21, 23 and 22, 24 will be in operative engagement and pin 54 will release the reels for rotation.

Referring to FIG. 8, it can be seen that shaft 67 and 73 for clutch members 21 and 22 are symmetrically mounted in yoke 70. Shaft 67 and 73 are fixed to worm wheels 71 and 72, which mesh with worms 85 and 86 on the two ends of the shafts 87 of motor 90. Worms 85 and 86 are arranged so as to drive worm wheels 71 and 72 in the same direction. Motor 90 is preferably a reversible motor and a switch 91 is provided on the front panel for reversing the power connections to motor 90 so as to reverse the direction of rotation. Motor 90 is mounted on bottom plate 92 of yoke 70 by means of bolts 93.

The front panel of casing 10 may also be provided with a power switch 101 and an off-play switch 102 connected in series with the motor. There is also provided a volume control 103 of any suitable kind, such as a potentiometer, connected across the output of magnetic heads 17 and 18.

At the end of the playing of a record, it is desirable to either stop the motor or reverse it automatically in order to prevent the tape from being completely unwound from one of the reels. For this purpose, tape 30 is provided near one of its ends with a longitudinal slot 110. A spring pressed arm 111 has a rotary conductive wheel 112 mounted on its outer end. Wheel 112 serves as a feeler contact so that when the slot 110 is encountered, wheel 112 makes contact through the tape with conductive posts 33. Conductive arm 111 is connected by conductor 113 to one side of the power circuit. The other side 114 of the power circuit extends to one side of solenoid 115. The other end of solenoid 115 may be connected to conductive posts 33 in any suitable manner so that when slot 110 in tape 30 arrives at post 33, a current is passed through solenoid 115 to operate the same. The armature 116 of solenoid 115 is connected to switch 102 so as to throw it to its off position when the solenoid is energized. In this position of switch 102, connections 117, 118 to motor 90 are broken at contacts 119, 120. Thus, when the end of the tape is reached, the motor 90 is cut off. The operator may then throw switch 91 to the reverse position and then manually turn switch 102 to its playing position in order to drive tape 30 in a reverse direction, for the purpose of either rewinding tape 30 or for playing a second recording on tape 30. Alternatively, solenoid 115 may be connected to operate switch 91 in order to reverse the motor instead of stopping it. If the tape is provided with two recordings, one may be located above the other and the pick-up elements of magnetic heads 17 and 18 will be staggered, as shown, in order to play one recording when the tape is being wound in the forward direction and the other recording when it is being wound in the forward direction.

I have described what I believe to be the best embodiments of my invention. I do not wish, however, to be confined to the embodiments shown, but what I desire to cover by Letters Patent is set forth in the appended claims.

I claim:

1. A magnetic tape record assembly including a casing, a pair of reels, first means integral with said reels, for mounting said reels in said casing for rotation on parallel axes, second means connected to said first means for coupling a rotary drive thereto, a magnetic tape wound on said reels, means for positioning a portion of the span of said tape extending between said reels adjacent one sidewall of said casing, said sidewall having an opening along said portion of the span of said tape, means for holding said tape against a magnetic head positioned at said opening, means mounted on said casing for fastening said reels against rotation and means for releasing said fastening means only when said casing is mounted for operation, said fastening means comprising a leaf spring extending from one reel to the other reel and bearing against the top surfaces of the reels near their peripheries and means for fixing said leaf spring centrally thereof to said casing, and said releasing means including slidable means mounted on the bottom wall of said casing having a unitary member for raising both ends of said spring for releasing said reels for rotation.

2. A magnetic tape record assembly comprising a shallow rectangular casing having major top and bottom walls and narrow interconnecting side walls, said bottom wall having a pair of spaced openings therein, a bearing fastened to the bottom wall centrally of each of said openings, a pair of magnetic tape receiving reels, a magnetic tape wound on said reels, each reel having a hub rotatably mounted in one of said bearings, a clutch member on the end face of each hub juxtaposed to an opening in the bottom wall, said casing having an opening in one side wall thereof, means for pressing a portion of the tape toward the opening in said side wall, means mounted on said casing for fastening said reels against rotation and means for releasing said fastening means only when said casing is mounted for operation, said fastening means comprising a leaf spring extending from one reel to the other reel and bearing against the top surfaces of the reels near their peripheries, and means for fixing said leaf spring centrally thereof to said casing, said releasing means including slidable means mounted on the bottom wall of said casing having a unitary member for raising both ends of said spring for releasing said reels for rotation.

3. An assembly according to claim 2, including switch means for stopping or reversing the driving of said reels and means near both ends of said tape for operating said switch means comprising a slot extending longitudinally of said tape and intermediate the edges thereof and wherein said switch means includes a conductive post on one side of said magnetic tape, a movable switch arm adapted to engage the other side of said tape, said switch arm having a feeler portion which is narrower than the slot in said tape and an electrical connector connected to said switch arm.

4. In a magnetic record assembly having a pair of reels mounted within a casing for rotation about parallel axes, unitary stop means comprising a flat spring connected centrally to said casing and having ends overlying said reels in pressure contact therewith, a shaft slidably mounted in said casing for movement towards and away from said flat spring, a member intermediate said flat spring and said shaft and extending between said flat spring ends, access means in said casing and leading to said shaft whereby said shaft may be moved towards said flat spring by the entry of external means into said access means in said casing, and said member may be moved by said shaft and said flat spring ends may be lifted out of simultaneous pressure contact with said reels.

5. A magnetic tape record assembly including a casing, a pair of reels, first means integral with said reels for mounting said reels in said casing for rotation on parallel axes, second means connected to said first means for coupling a rotary drive thereto, a magneitc tape wound on said reels, means for positioning a portion of the span of said tape extending between said reels adjacent one side wall of said casing, said side wall having an opening along said portion of the span of said tape, means mounted on said casing for fastening said reels against rotation and means for releasing said fastening means only when said casing is mounted for operation, said fastening means comprising a leaf spring extending from one reel to the other reel and bearing against the top surfaces of the reels near their peripheries and means for fixing said leaf spring centrally thereof to said casing, and said releasing means including slidable means mounted on the bottom wall of said casing having a unitary member for raising both ends of said spring for releasing said reels for rotation.

6. In a magnetic record assembly having a pair of reels mounted within a casing for rotation about parallel axes, releasable stop means comprising slidable means mounted in the casing, a flat spring extending between the reels and connected intermediate its ends to the casing, the ends of said spring being biased against said reels, cushioning means interposed between the ends of said flat spring and said reels, said slidable means being movable to and from said flat spring and being engageable threwith to move the same out of pressure contact with the reels, and an access provided in the casing leading to said slidable means, whereby external means may contact said slidable means to move the same.

References Cited in the file of this patent

UNITED STATES PATENTS

| | | |
|---|---|---|
| 1,393,500 | Clark | Oct. 11, 1921 |
| 1,936,043 | Thomas | Nov. 21, 1933 |
| 2,487,170 | Nygaard | Nov. 8, 1949 |
| 2,584,733 | Owens | Feb. 5, 1952 |
| 2,676,766 | Ross et al. | Apr. 27, 1954 |
| 2,778,636 | Eash | Jan. 22, 1957 |
| 2,838,250 | Stavrakis et al. | June 10, 1958 |
| 2,983,794 | Shields | May 9, 1961 |
| 3,027,110 | Andrews | Mar. 27, 1962 |